United States Patent [19]

Davidson, Jr.

[11] Patent Number: 5,651,114
[45] Date of Patent: Jul. 22, 1997

[54] EXTERNAL NETWORK ADAPTER FOR HANDLING NORMAL AND ALTERNATE CHANNEL DATA OVER A SINGLE BI-DIRECTIONAL CHANNEL CONNECTED TO A PRINTER

[75] Inventor: Peter Stewart Davidson, Jr., Lexington, Ky.

[73] Assignee: Lexmark International, Inc., Lexington, Ky.

[21] Appl. No.: 494,045

[22] Filed: Jun. 23, 1995

[51] Int. Cl.⁶ .............................. G06F 3/12; G06F 13/38
[52] U.S. Cl. .................. 395/200.02; 395/114; 395/309; 364/930; 364/940.62; 364/975.1; 364/DIG. 2; 364/235; 364/242.95
[58] Field of Search ...................... 395/800, 831, 395/832, 840, 841, 859, 882, 885, 892, 566, 281, 282, 309, 200.02, 200.2, 200.03, 200.13, 200.15, 200.18, 114; 364/DIG. 1, DIG. 2

[56] References Cited

U.S. PATENT DOCUMENTS

| | | | |
|---|---|---|---|
| 4,611,274 | 9/1986 | Machino et al. | 395/200.02 |
| 4,748,560 | 5/1988 | Kataoka | 395/200.02 |
| 5,220,674 | 6/1993 | Morgan et al. | 395/800 |
| 5,241,629 | 8/1993 | Barlow et al. | 395/325 |
| 5,247,623 | 9/1993 | Sun | 395/286 |
| 5,303,336 | 4/1994 | Kageyama et al. | 395/114 |
| 5,371,837 | 12/1994 | Kimber et al. | 395/114 |
| 5,410,754 | 4/1995 | Klotzbach et al. | 370/466 |
| 5,481,542 | 1/1996 | Logston et al. | 370/94.2 |
| 5,550,957 | 8/1996 | Davidson, Jr. et al. | 395/114 |
| 5,557,752 | 9/1996 | Remion | 395/285 |

OTHER PUBLICATIONS

Network Printing Alliance Protocol, A Printer/Host Control Specification, Level 1, Revision N, Feb. 11, 1994, Developed By The Network Printing Alliance.

*Primary Examiner*—Meng-Ai T. An
*Attorney, Agent, or Firm*—Frederick H. Gribbell

[57] ABSTRACT

An External Network Adapter (ENA) is provided that acts as an interface between a network and a parallel or serial port of at least one printer, in which host computers on the network may send print jobs to the External Network Adapter, and these print jobs will be communicated to the printers in a manner that the print jobs will be printed correctly. The External Network Adapter can additionally receive NPAP queries and NPAP commands from a host computer over the network, and transfer those NPAP queries or commands to each of the printers at virtually any time, including during a print job. If the ENA receives any NPAP query or NPAP command from a host computer via the network, such NPAP queries or commands are sent to the printer between print job packets. In this manner, the ENA emulates having a second or Alternate Channel of communications to the printer, since NPAP queries or commands can be sent to the printer in the middle of a print job, whether the print job consists of host-packetized NPAP print data or non-NPAP print data.

15 Claims, 8 Drawing Sheets

EXTERNAL NETWORK ADAPTER FOR HANDLING NORMAL AND ALTERNATE CHANNEL DATA OVER A SINGLE BI-DIRECTIONAL CHANNEL CONNECTED TO A PRINTER

TECHNICAL FIELD

The present invention relates generally to communications interfacing equipment and is particularly directed to an External Network Adapter of the type which acts as an interface between a network and a parallel or serial port of at least one printer. The invention is specifically disclosed as an External Network Adapter that receives both NPAP and non-NPAP print jobs and NPAP queries and NPAP commands over a network from host computers, and virtually simultaneously transmits both such print jobs and NPAP queries and commands to the printer in real time without having to wait for the end of the print job before sending the NPAP query or command.

BACKGROUND OF THE INVENTION

Conventional printing systems typically include several host computers and several printers, all connected to one another via a network, such as a local area network (LAN). Many modern printers, including laser printers and ink jet printers, contain a network adapter which allows such printers to interface into the network, and more recently, such printers have begun communicating with host computers via networks using a Network Printer Alliance Protocol (NPAP), which defines a bi-directional means for communication between host computers and printers. Communications using NPAP compliant data and commands are transported under various network Protocols, such as TCP/IP.

Details of the published NPAP are contained in the NPAP Specification Level 1, Revision N, dated Feb. 11, 1994. This NPAP specification is incorporated herein by reference. The employment of the NPAP means of communication is described in a number of examples for a single Protocol network adapter interface in a commonly assigned U. S. patent application, Ser. No. 08/350,860, U.S. Pat. No. 5,550,957; titled MULTIPLE VIRTUAL PRINTER NETWORK INTERFACE, filed Dec. 7, 1994, which is also incorporated herein by reference.

The network adapter interface described in the above patent application is an Internal Network Adapter (INA) which is plugged into an internal option port (an "IOP slot") of a preferred laser printer. A printer having a serial port or a parallel port can also be attached to a network via an External Network Adapter (ENA), which is the subject matter of the present invention. The advantage of using an Internal Network Adapter (INA) is that the INA can contain two channels, a "Normal Channel" and an "Alternate Channel," which can each carry data communications between the network and the printer, in which messages carried by these dual channels can be communicated simultaneously. If, for example, the printer is currently busy with a print job received through the Normal Channel from a host computer via the network, the same printer can simultaneously receive, for example, an NPAP query or an NPAP command through the Alternate Channel from the same host, or a different host computer, also through the same network. This gives the printer having an INA a great amount of flexibility in transmitting and receiving both data and commands through the network. An External Network Adapter cannot simply duplicate the INA's hardware and software, since the ENA communicates to a printer via a single channel connection (i.e., via a parallel port or a serial port). Even though the parallel or serial port is a bi-directional port, it can only transmit or receive a single data packet at any given moment.

SUMMARY OF THE INVENTION

Accordingly, it is a primary object of the present invention to provide an External Network Adapter (ENA) that can send NPAP queries and NPAP commands to a printer at any time, including during a print job.

It is another object of the present invention to provide an External Network Adapter that can receive NPAP responses from a printer at any time, including during a print job.

It is a further object of the present invention to provide an External Network Adapter that can receive "Alert" messages from a printer at any time, including during a print job.

It is yet another object of the present invention to provide an External Network Adapter that can send both NPAP and non-NPAP print jobs to a printer in such a way that both types of print jobs will be printed correctly by that printer.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an External Network Adapter (ENA) is provided that acts as an interface between a network and a parallel or serial port of at least one printer, in which host computers on the network may send print jobs to the External Network Adapter, and these print jobs will be communicated to the printers in a manner that the print jobs will be printed correctly. The External Network Adapter can additionally receive NPAP queries and NPAP commands from a host computer over the network, and transfer those NPAP queries or commands to each of the printers at virtually any time, including during a print job. The ENA that receives both NPAP print jobs and non-NPAP print jobs via the network from one or more host computers, however, before the print job information is further communicated to a printer, the ENA packetizes all of the non-NPAP print data in NPAP wrappers. In this manner, the printer sees only NPAP packets from the ENA. If the ENA receives any NPAP query or NPAP command from a host computer via the network, such NPAP queries or commands are sent to the printer between print job packets. In this manner, the ENA emulates having a second or Alternate Channel of communications to the printer, since NPAP queries or commands can be sent to the printer in the middle of a print job.

The External Network Adapter also receives messages from the attached printer, and these messages will preferably be in NPAP packets. When receiving a message from the printer, the ENA examines this message to determine whether it contains either "Alternate Channel"-type data, or "Normal Channel"-type data, and the ENA sends the message along to its appropriate host computer on the appropriate channel. In this regard, the ENA closely emulates a preferred Internal Network Adapter that can be plugged into a modern printer in which the Internal Network Adapter has two physical data channels, a Normal Channel for "in-band" communications, and an Alternate Channel for "out-of-band" communications.

The External Network Adapter of the present invention ensures that all data transmitted to its connected printer is wrapped in NPAP packets. If a print job received from a host computer via the network is of a non-NPAP format, the ENA utilizes an NPAP Packetizer that creates a five-byte header that contains the length of the data, and concatenates the header with the original data string. Before the message is transmitted to the printer, the ENA utilizes an NPAP Packet Writer, which determines what message is communicated to the printer next. The NPAP Packet Writer received data from three sources: 1) the NPAP Packetizer, 2) NPAP print jobs that are packetized by a host computer, 3) and an NPAP Request Handler which receives NPAP commands and NPAP queries over the network from host computers, via the Alternate Channel of the ENA. The NPAP Packet Writer may receive complete packets or partial packets of NPAP print job data, and the NPAP Packet Writer finds the packet boundaries within the NPAP print jobs. Once a boundary between NPAP print jobs is found, other NPAP packets from the NPAP request handler (i.e., Alternate Channel-type packets containing NPAP queries or NPAP commands) can be inserted between the end boundary of one NPAP print job packet, and the beginning boundary of the next NPAP print job packet.

The ENA also includes a Back Channel Data Analyzer which receives NPAP packets from the connected printer. This type of communication can be of three types: 1) an "Alert", such as a Device Status Alert, 2) an NPAP response to an earlier NPAP command sent by the NPAP Request Handler, or 3) Back Channel data of a print job. The Back Channel Data Analyzer routes such messages according to their type, in which alerts and NPAP responses are sent via the Alternate Channel, and Back Channel data of print jobs is sent via the Normal Channel. In this manner, the ENA emulates the operation of a preferred Internal Network Adapter that can be installed inside a preferred laser printer.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
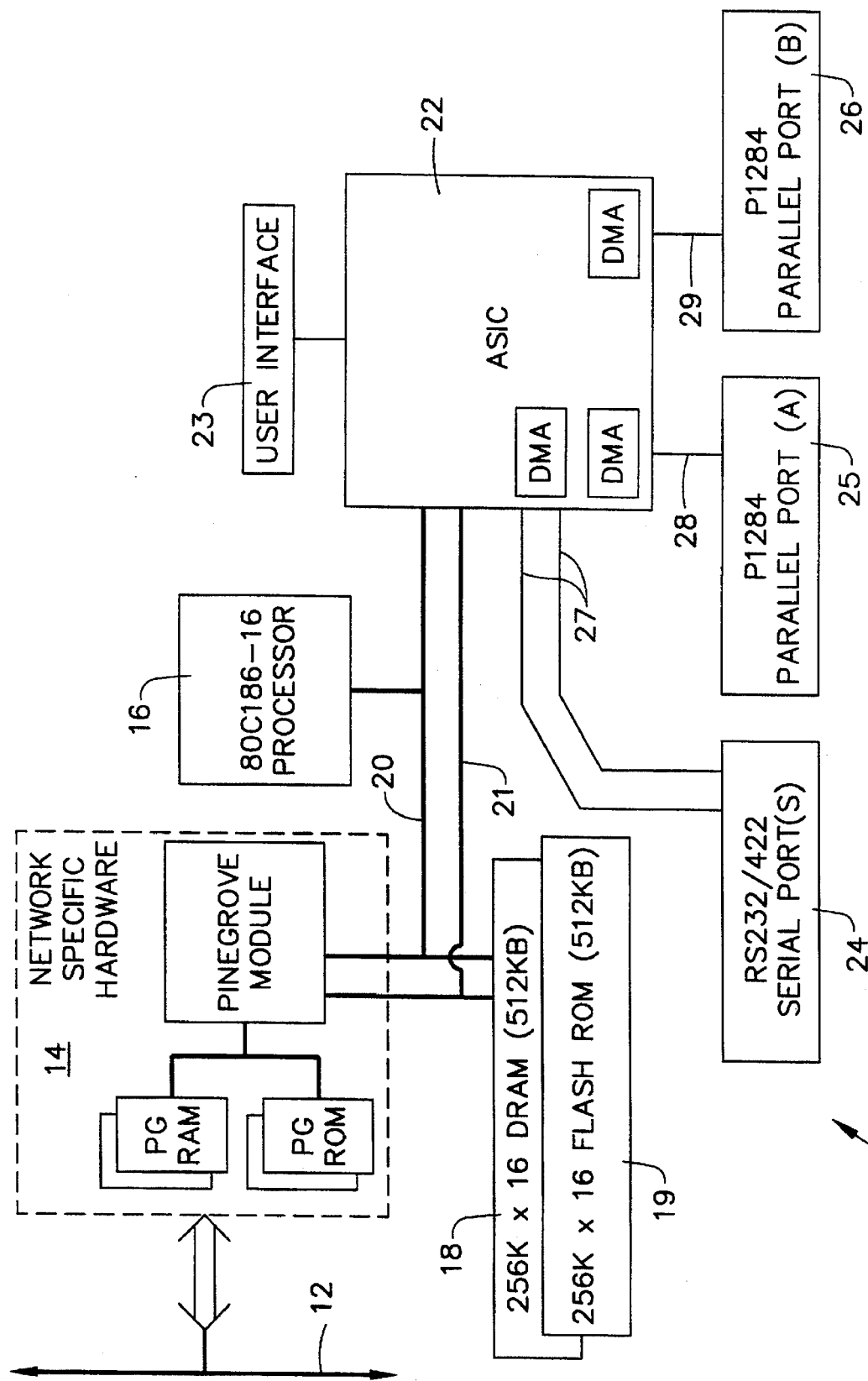
FIG. 1 is a block diagram depicting the hardware of an External Network Adapter constructed according to the principles of the present invention.

Referring now to the drawings, FIG. 1 shows the major hardware components of an External Network Adapter (ENA), generally designated by the index numeral 10. A network 12, such as a Local Area Network (LAN), is connected to the External Network Adapter 10 via network specific hardware, generally designated by the index numeral 14. In FIG. 1, the major components for a Token Ring interface are depicted as a chip set including a "Pine-Grove" module manufactured by IBM with associated Pine-Grove RAM and PineGrove ROM. ENA 10 includes a microprocessor 16, preferably a part number 80C186-16 manufactured by Advanced Micro Devices, which is connected to other hardware modules via a data bus 20 and an address bus 21. The data bus is preferably sixteen (16) bits wide, and the address bus is preferably twenty (20) bits wide.

Random Access Memory (RAM) and Read Only Memory (ROM) are connected to microprocessor 16 via the address and data buses. The preferred RAM is a dynamic RAM chip, of the configuration 256K×16, and designated by the index numeral 18. The preferred ROM is an integrated circuit having the configuration 256K×16 Flash ROM, and designated by the index numeral 19. The address and data buses are also connected to the network specific hardware 14, via its PineGrove module. If, for example, the network 12 is an ETHERNET™ system, then the network specific hardware depicted in block 14 would preferably be replaced by a MACE module, having the part number Am79C740, manufactured by Advanced Micro Devices.

The address and data buses are also connected to an ASIC chip 22, which is used to interface to the communications ports and to the user interface. The user interface, generally designated by the index numeral 23, preferably comprises a series of switches and lamps, such as a pushbutton "reset" switch, a pushbutton "test" switch (which when depressed, prints out a test page at the connected printer), and a two-position selector switch which chooses a particular configuration used on the network. For example, for a Token Ring ENA, the two-position switch selects an operating speed of either 4 Megabits per second, or 16 Megabits per second. Alternatively, for an ETHERNET ENA, the two-position switch selects the configuration of the type of cable used in the network, either a 10 base 2 (i.e., for a coax connector), or for 10 base T (i.e., for a telephone line). The lamps on the user interface 23 preferably include a "power on" lamp, a second lamp that blinks when data is being sent to the printer, a third "test" lamp that energizes when the test button is depressed, and a fourth "status" lamp which illuminates when an error occurs.

The ASIC 22 interfaces to the communications ports, preferably a serial port 24 and two parallel ports 25 and 26. The serial port communicates over a bi-directional channel designated by the index numeral 27, via a Direct Memory Access (DMA) into the ASIC 22. Serial port 24 preferably is either RS232 or RS422 compatible. Each parallel port 25 and 26 can communicate via a single channel, bi-directional parallel link 28 or 29, respectively, and uses Direct Memory Access (DMA) into ASIC 22. Each parallel port preferably operates according to the IEEE 1284 standard for bi-directional parallel ports.

Figure 2:
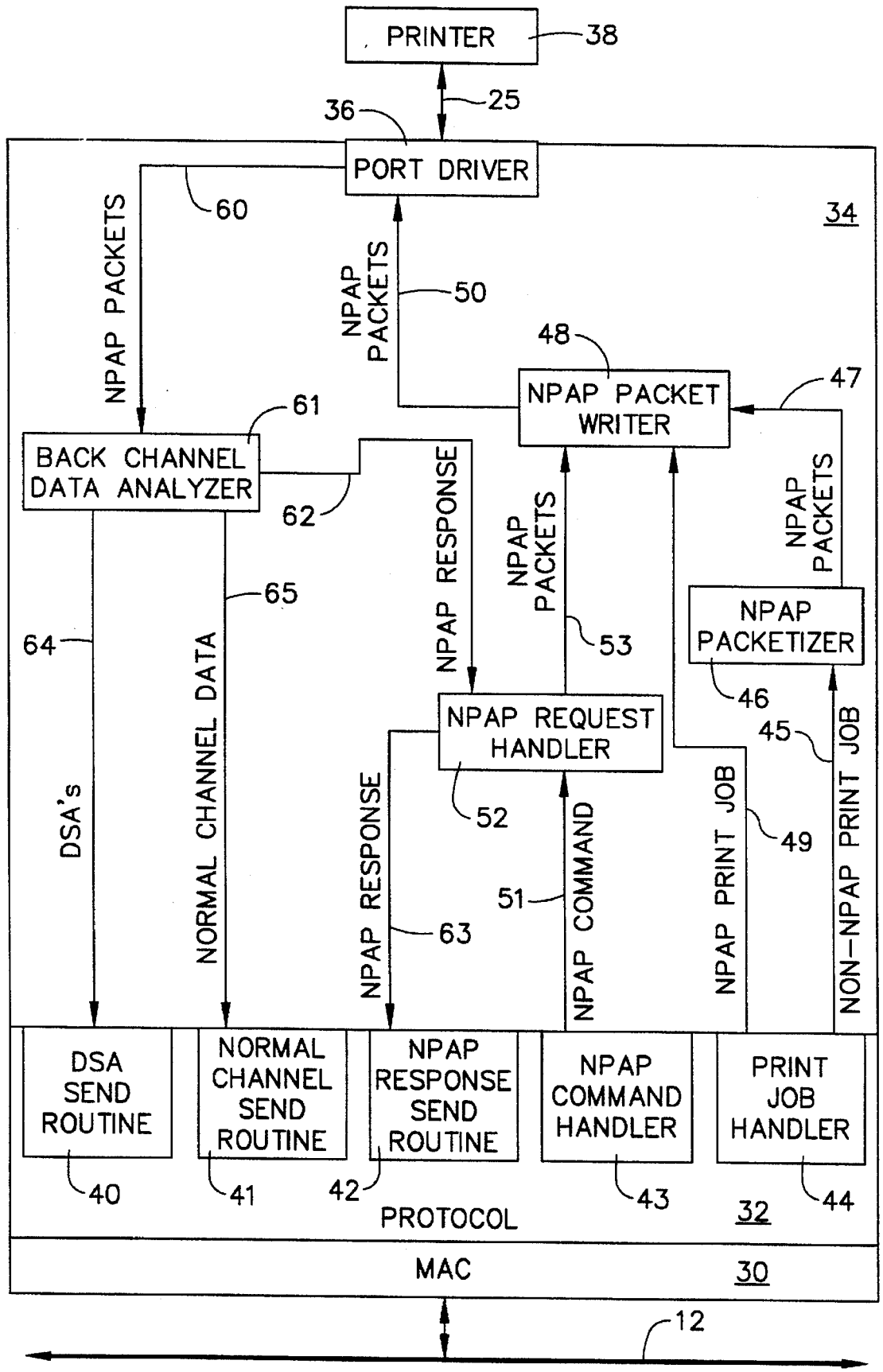
FIG. 2 is a functional block diagram depicting the various tasks performed and the logical flow between these tasks of the External Network Adapter of FIG. 1.

FIG. 2 depicts the major tasks preformed by the Printer Device portion, designated by the index numeral 34, of the ENA 10. ENA 10 preferably is a model MarkNet XLe, manufactured by Lexmark International located in Lexington, Ky. On FIG. 2, only one port driver 36 is depicted, however, the preferred MarkNet XLe ENA will contain (as a minimum) two parallel ports, plus one optional serial port. Furthermore, the preferred MarkNet XLe ENA will contain four Protocols, such as Protocol 32 on FIG. 2, the four Protocols being: (1) LexLink, (2) NetWare, (3) Apple Talk, and (4) TCP/IP. For purposes of simplification, FIG. 2 describes the functions of the ENA 10 for only one Protocol 32 and one port driver 36, however, it will be understood that the network port (i.e., the network specific hardware 14) connected to network 12 can handle all four Protocols simultaneously, and all three printer ports (i.e., serial port 24, and parallel ports 25 and 26) can communicate to a separate printer virtually simultaneously. Although the ENA can receive data in each of these network Protocols simultaneously, only one of the Protocol modules may have access to a printer at any one time for printing print jobs, although a different protocol can intersperse an NPAP Command or NPAP Query to the printer during such access. This access is called "capturing the printer," and will be discussed in detail hereinbelow.

Referring again to FIG. 2, MAC 30 represents a Media Access Control function that interfaces between the network port and each of the Protocols, such as Protocol 32. The functions of MAC 30 will be described in greater detail hereinbelow. Protocol 32 is illustrative of one of the four Protocols presently supported by the preferred ENA, and includes several tasks such as a Device Status Alert Send Routine 40, a Normal Channel Send Routine 41, an NPAP Response Send Routine 42, an NPAP Command Handler 43, and a Print Job Handler 44. A "Normal Channel" communication received by ENA 10 is processed through the Print Job Handler 44. An "Alternate Channel" communication received by ENA 10 is processed through the NPAP Command Handler 43. A communication transmitted back to the network 12 through the Normal Channel Send Routine 41 uses the Normal Channel. An Alert communication using the DSA Send Routine 40 and an NPAP response using the NPAP Response Send Routine 42, each to be communicated to the network 12, both use the Alternate Channel.

Figure 3:
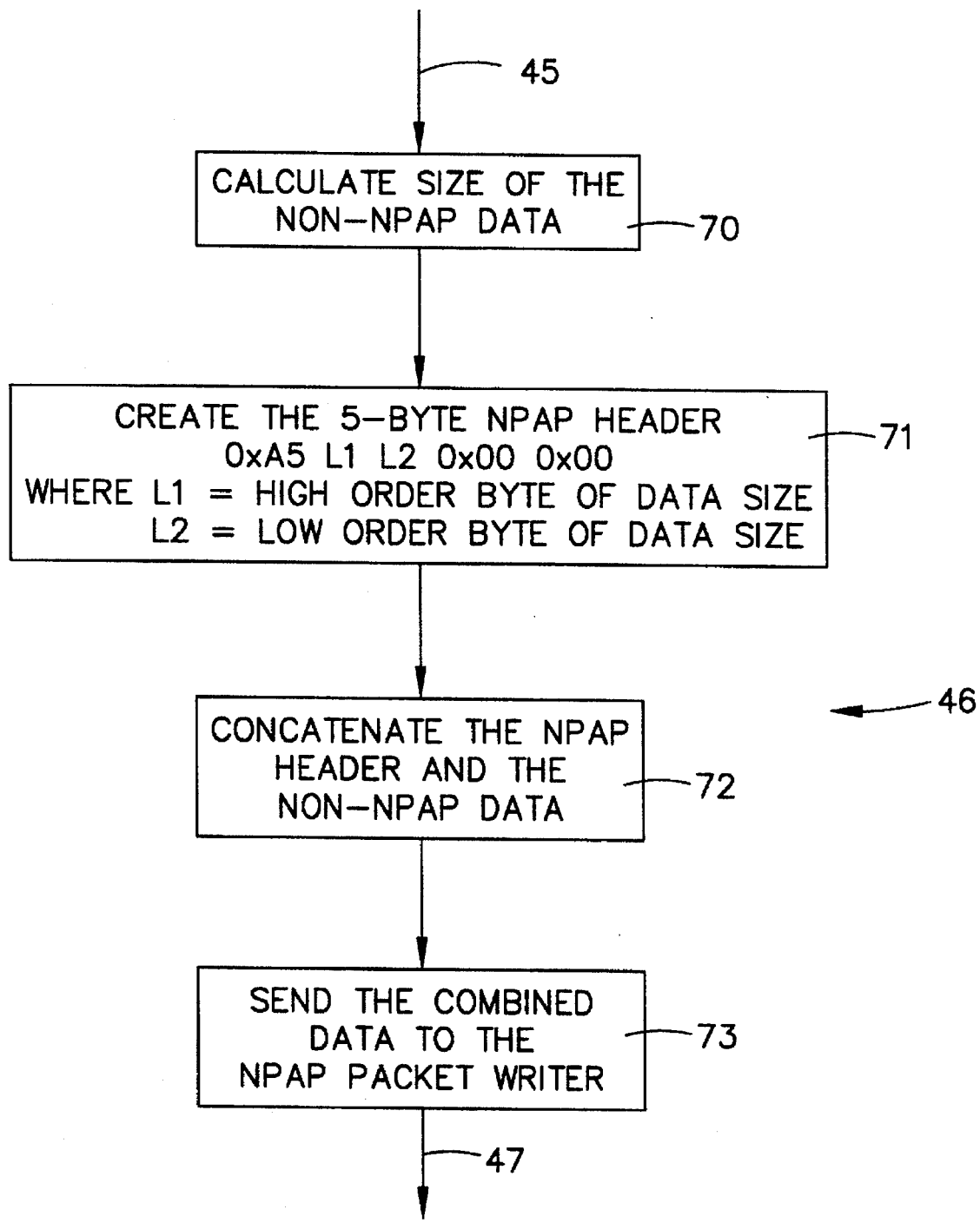
FIG. 3 is a flow chart of an NPAP Packetizer, which is one of the tasks depicted in FIG. 2.

Conventional print job data will be non-NPAP, which will pass from network 12 through MAC 30, Protocol 32, Print Job Handler 44, and along arrow 45 to an NPAP Packetizer designated by the index numeral 46. The detailed operations of NPAP Packetizer 46 are provided on FIG. 3, which first calculates the size of the non-NPAP data at function block 70. Function block 70 inspects a pointer provided by Protocol 32 which points to the beginning of the actual data of the non-NPAP data message. Protocol 32 also provides a "length" field, which is also used by function block 70. It will be understood that a typical network will break down a print job into standard "network packets" of a standard size, such as 512 bytes or 1024 bytes. The original print job sent by a host computer may be 10,000 bytes in length, however, the network 12 will not allow itself to be kept busy with this one large communication, and therefore, reduces each packet of data into this standard network packet size. With this in mind, when function blocks 70 calculates the size of the non-NPAP data, that size often will be the size of the standard network packet (i.e., 512 or 1024 bytes).

Once the size of the non-NPAP data has been determined, function block 71 creates a 5-byte NPAP header of the format:

A5 L1 L2 00 00        (illustrated in hexadecimal format)

where "L1" is the high order byte of data size, and "L2" is the low order byte of data size. This 5-byte NPAP header is now concatenated with the non-NPAP data (i.e., the print job data) at function block 72. This combined data stream is now sent to the NPAP Packet Writer at function block 73, following the arrow 47 on FIG. 2.

The NPAP Packet Writer, designated by index numeral 48, can receive data from three different sources, from the NPAP Packetizer 46 along arrow 47, from the Print Job Handler 44 along arrow 49, and from an NPAP Request Handler 52 along arrow 53. The details of the operation of NPAP Packet Writer 48 are provided in FIG. 4.

NPAP Packet Writer 48 is initialized at a function block 80, and part of this initialization is to set a variable designated as "STATE" to the status of "beginning," which refers to what portion of a host packetized NPAP packet is presently being received. The STATE variable is particularly important for NPAP print job data that travels through Print Job Handler 44 along arrow 49. Such NPAP print job data is packetized by the host computer at the other end of the network, in which the host computer uses a separate computer program, such as the print spooler for OS/2™, manufactured by IBM, which has the capability of creating NPAP print jobs, as opposed to creating conventional print jobs that send only non-NPAP data.

As noted above, NPAP Packet Writer 48 may receive data from three different sources at a function block 81. Following the logical flow, a decision block 82 determines whether or not the data was received from the NPAP Request Handler 52 along arrow 53. If the answer is YES, then a decision block 83 determines whether or not the STATE is equal to "beginning." If the answer is NO, that means that the most recent NPAP print job data handled by NPAP Packet Writer 48 did not finish with an end boundary, and therefore, the next NPAP print job packet received along arrow 49 would be a continuation of that original print job data. In this situation, the NPAP Packet Writer 48 will not allow an NPAP command to be sent to the printer, so a function block 84 tells the NPAP Request Handler 52 to try sending the same message again at a later time. It will be understood that the Request Handler should not try again immediately, since there is an NPAP print job in process, and NPAP Packet Writer 48 wants to finish a complete packet for that print job before allowing the NPAP Request Handler 52 to transfer any NPAP command through to the printer.

If decision block 83 determines that the STATE is equal to "beginning", then the logical flow follows the YES arrow to a function block 85. At this point, NPAP Packet Writer 48 saves the "Command" and the "Subcommand", and notes that the Command and Subcommand are "expected." The NPAP Command and Subcommand are the fifth and sixth bytes of the data message the comprises an NPAP command packet. Since the current message being handled by NPAP Packet Writer 48 is an NPAP command sent by the NPAP Request Handler 52, a response will be expected from the printer 38. The pertinent NPAP Command and Subcommand are temporarily saved at function block 85 until the expected response is received from printer 38, which will be detected by the Back Channel data analyzer 61, as described below. The Back Channel Data Analyzer will compare the actual response from printer 38 to the expected response, which has been temporarily stored by function block 85.

Once the Command and Subcommand have been stored, the logical flow continues to a function block 86, at which time the pertinent data is sent to printer 38, along arrow 50 on FIG. 2. As related above, if the STATE is not equal to "beginning," the NPAP Request Handler 52 must try again later to send the NPAP command to the printer. When a host-packetized NPAP packet finally reaches an end boundary, the desired NPAP command will finally be allowed to be sent to printer 38 using the logical flow through decision block 82, decision block 83, function block 85, and function block 86.

If decision block 82 determines that the data received is not from the NPAP Request Handler 52, then the logical flow follows the NO arrow to a decision block 90, which asks if the data is from the NPAP Packetizer 46. If the answer to this question is YES, this data is immediately sent to the printer at function block 86. In this circumstance, the print job currently being handled by NPAP Packet Writer 48 originally consisted of non-NPAP print job data from a host computer, and therefore, NPAP Packetizer 46 operated upon this data to add the 5-byte NPAP header, as described hereinabove. In this situation, NPAP Packet Writer 48 knows in advance that the data packet is a "full" packet, since it was packetized by the ENA 10 itself, and there would be no chance of the network 12 breaking down the print job data into potentially incomplete packets that may not contain an end boundary.

If decision block 90 determines that the data was not received from NPAP Packetizer 46, then the logical flow follows the NO arrow to a function block 91 which deduces that the data is an NPAP print job from one of the Protocols of the ENA. The first important question at this point is whether or not the STATE is at the "beginning," as asked by a decision block 92. If the answer is YES, the logical flow arrives at a decision block 93 which asks if at least one full NPAP packet is contained in this data message. If the answer to this question is NO, the STATE is set to "middle" by a function block 94, and this data is sent to the printer by function block 86. In this circumstance, a host-packetized NPAP print job was received that was greater in length than the network packet received by NPAP Packet Writer 48. This means that there is more data for that particular print job remaining to be printed as soon as the rest of that print job is received, via future network packets (and no newly arriving Alternate Channel NPAP Command or NPAP Query can be interspersed with these print job packets).

If decision block 93 determines that there is at least one full NPAP packet contained in this particular message, then the logical flow follows the YES arrow to a function block 95 which will send the amount of data up to the packet boundary to the printer. Function block 95 recognizes that there could be more than one NPAP packet contained in this particular data message, but it stops at the packet boundary so that an incoming NPAP command or query may be more immediately sent to printer 38 by being interspersed between various print job NPAP packets. In this circumstance, a function block 96 tells the Protocol 32 to send the remaining print job data again at a later time. Function block 96 keeps track of how many bytes from this data message have been sent to the printer, and the Protocol is to resend only the remaining data that starts after that number of bytes.

If decision block 92 determines that the STATE is not equal to beginning, then the logical flow follows the NO arrow to a decision block 97 which determines if a packet boundary is contained in this particular data message. If the answer to this questions is NO, the logical flow arrives at a function block 99 that immediately sends the data to the printer, and the STATE will remain equal to "middle." In a future pass through the flow chart, decision block 97 will eventually find a packet boundary contained in the data, and the logical flow will follow the YES arrow to a function block 98. When this occurs, the STATE variable is set to "beginning", even though the physical reality is that an end boundary has been found, and there is not necessarily another data message having a beginning boundary following immediately thereafter. In other words, function block 98 is artificially setting the STATE flag to "beginning" so that the next pass through the flow chart will have a different result upon reaching decision block 92. The logic flow now arrives at function block 95 which sends the data message up to the packet boundary to the printer 38, and also tells the Protocol 32 to send the remaining data again at a later time (after telling the Protocol how many bytes have already been sent from that particular data message).

The operations of NPAP Packet Writer 48 are very dependent upon the value of the STATE flag, and whether or not either a full NPAP packet or a packet boundary is contained within a particular dam message being operated upon that has been received from a host-packetized NPAP packet. The primary considerations in the operations of NPAP Packet Writer 48 are to swiftly send print data to the printer, while even more quickly attempting to find boundaries between data packets so that NPAP commands may be interspersed between print job data messages being sent to printer 38. In this way, NPAP Packet Writer 48 closely emulates the operation of a dual channel Internal Network Adapter which can literally transfer both print job data and NPAP commands simultaneously.

Figure 5:
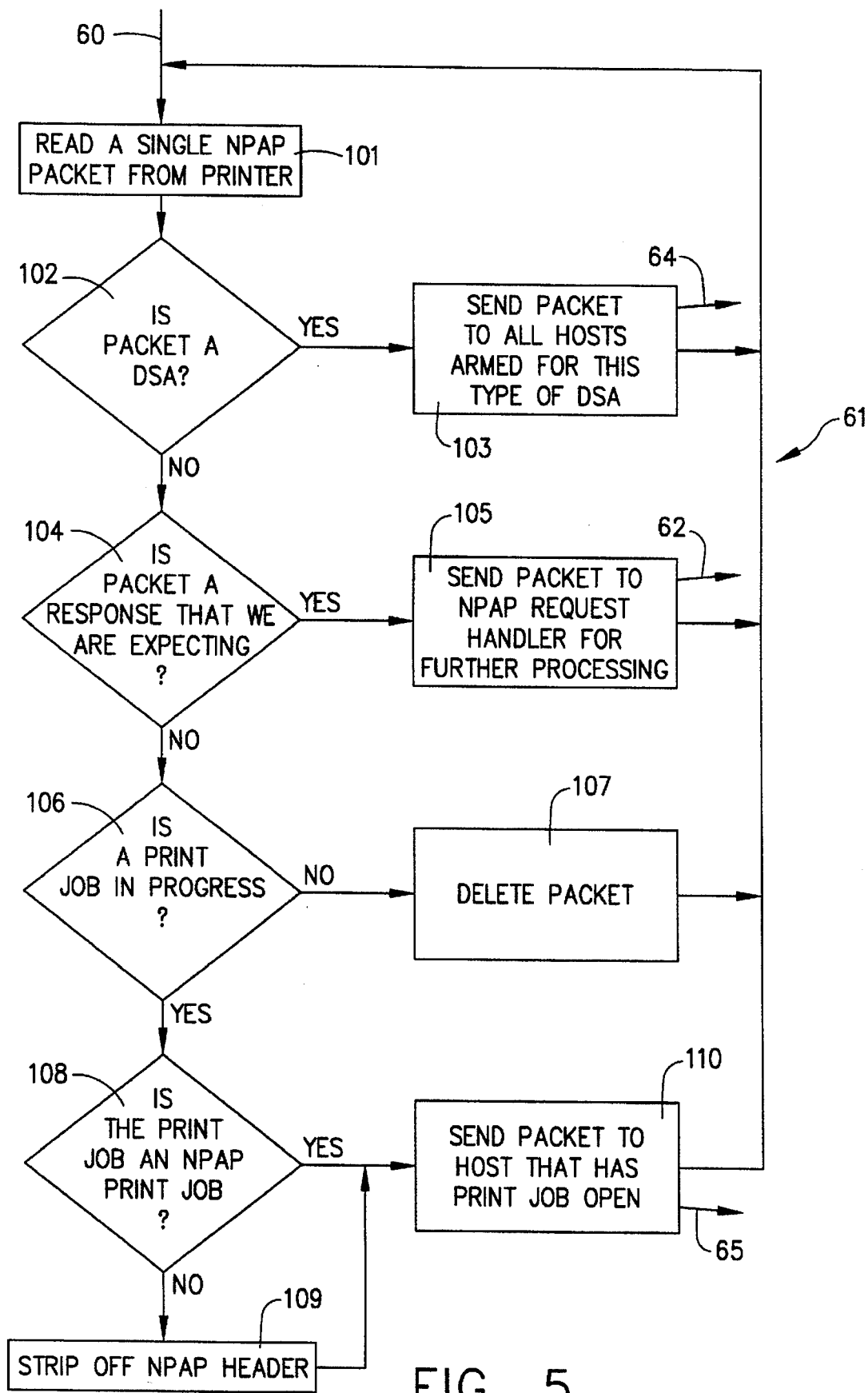
FIG. 5 is a flow chart of a Back Channel Data Analyzer, which is one of the tasks depicted in FIG. 2.

After the NPAP packets are transferred from the NPAP Packet Writer 48 to the port driver 36 via path 50, the printer 38 may have a return message to be passed through port driver 36 along path 60 to the Back Channel Data Analyzer 61, and its operations are described in detail FIG. 5. At a function block 101, the Back Channel Data Analyzer 61 reads a single NPAP packet from the printer 38. A decision block 102 determines whether or not the packet is a Device Status Alert (DSA), and if the answer is YES, the logical flow arrives at a function block 103 which sends the packet to all hosts that are "armed" for this type of DSA. This message is physically transmitted along path 64 on FIG. 2 to the DSA Send Routine 40.

If the incoming packet is not a DSA, function block 102 sends the logical flow along the NO arrow to a decision block 104 which determines whether or not the packet is a response that is "expected." If the answer is YES, the logical flow travels to a function block 105 that sends a packet to the NPAP Request Handler 52 along arrow 62 on FIG. 2, for further processing. If the packet is not a response that was expected, the logical flow follows the NO arrow from decision block 104 to a decision block 106 that asks if a print job is presently in progress. If the answer is NO, the packet is deleted by a function block 107 (and no further operation will occur in view of this packet). If there is a print job presently in progress, decision block 106 will direct the logical flow along the YES arrow to decision block 108 which asks if the print job is an NPAP print job. If the answer is YES, the logical flow is directed to a function block 110 that sends this packet to the host that presently has this print job open, along arrow 65 (on FIG. 2) to the Normal Channel Send Routine 41. If the present print job is a non-NPAP print job, the logical flow follows the NO arrow from decision block 108 to a function block 109 which strips off the NPAP header before sending the packet to the host that has this current print job open (at function block 110).

This type of message could occur, for example, if the printer's interpreter cannot find the particular font, so the printer may send a text message to the host computer. Since this is typically not an NPAP message, the NPAP header that was created by printer 38 needs to be stripped off before this text message is received by the host computer. This is typical print-type data message sent via the Normal Channel, so Protocol 32 stores a pointer to the identifier of the pertinent host for this particular print message. It will be understood that the ENA 10 keeps a data table of the active hosts that are attached to network 12, and the Protocol can identify each of these hosts as new data messages are received from that host. This is described in more detail hereinbelow. It will also be understood that, upon initialization of the ENA, many commands and responses are communicated between the printer and ENA 10, and in many cases, no message is sent to any host computer during this initialization set of messages.

Figure 4:
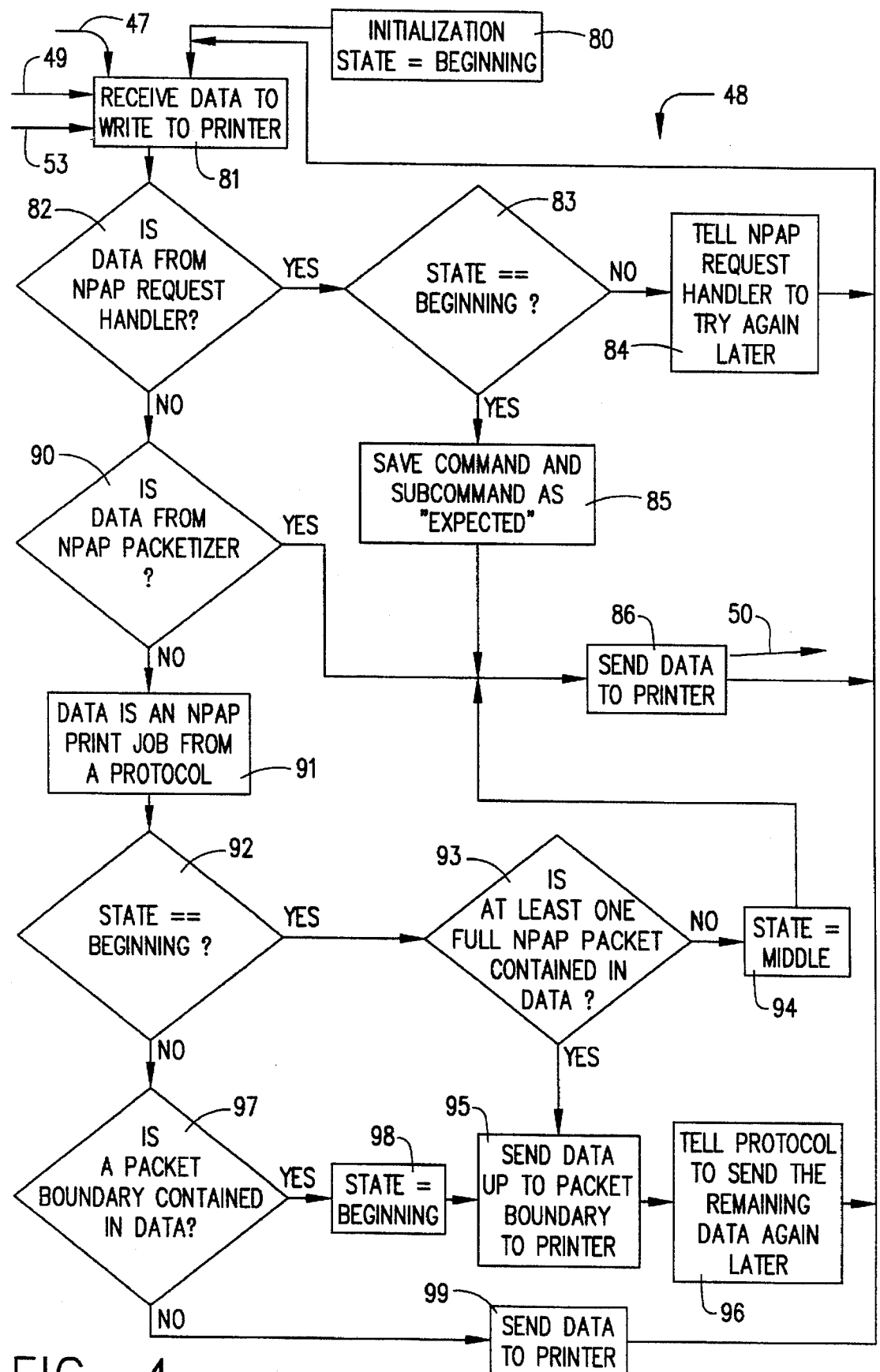
FIG. 4 is a flow chart of an NPAP Packet Writer, which is one of the tasks depicted in FIG. 2.

At decision block 104, a response that is "expected" will have the same command and subcommand bytes as were recently stored by function block 85 on FIG. 4 at the NPAP Packet Writer 48. It will be understood that the NPAP Request Handler 52 will not send a new NPAP command to NPAP Packet Writer 48 until after ENA 10 receives the correct NPAP response from printer 38 at the Back Channel Data Analyzer 61, unless, of course, no response is expected at all.

The NPAP Request Handler 52 operates in a similar manner to a function in an exemplary internal network adapter that implements printer status communications with multiple host computers.

Figure 8:
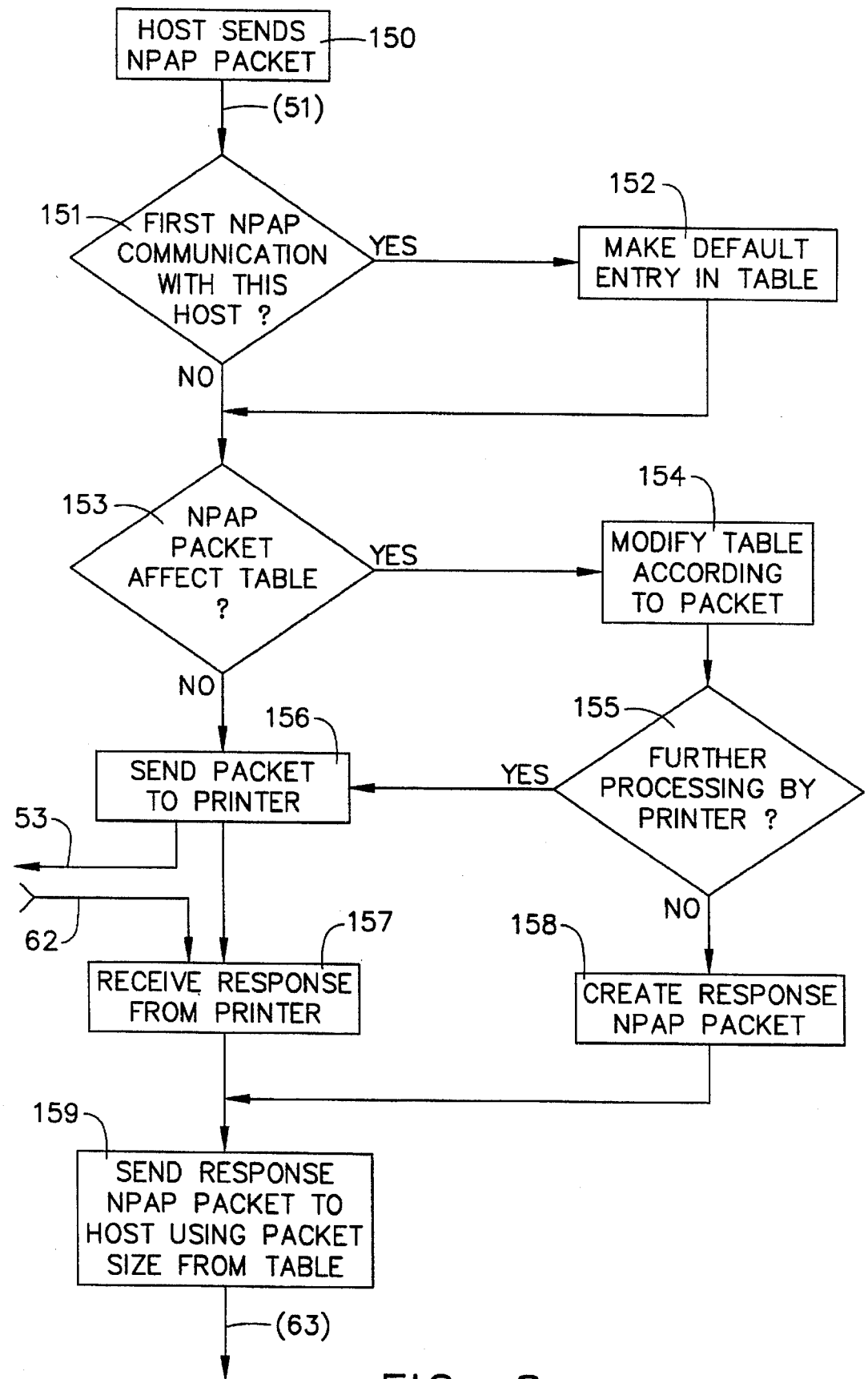
FIG. 8 is a flow chart of a portion of the NPAP Request Handler, which is one of the tasks depicted in FIG. 2.

With reference to FIG. 8, after a host computer sends an NPAP packet to the ENA over the network 12, and it is transferred from the network specific hardware 12 into an appropriate location in the RAM 18, the microprocessor 16 processes the packet by executing instructions in the ROM 19. The microprocessor first determines, at a decision block 151, if this is the first NPAP communication with this particular host computer. If it is, the processor, at a function block 152, makes a default entry for this host in a table of host data in the RAM 18.

For each host computer communicating NPAP-compatible data to ENA 10, the following information is maintained in a table: (1) which Device Status Alerts are enabled (requested by the host), (2) if operator panel updates with attributes are enabled, (3) if operator panel updates without attributes are enabled, (4) a host resettable counter, (5) the maximum host packet size, (6) active configuration changes that have not been read by the host, and (7) power on reset (POR) status that has not been read by the host. Default values placed in the table upon first communication with a host are (1) no device status alerts enabled, (2) no operator panel updates with attributes enabled, (3) no operator panel updates without attributes enabled, (4) host resettable counter set to zero, (5) maximum host packet size set to 64 bytes, (6) active configuration changes set to none, and (7) POR set on.

Each host computer can subsequently send NPAP commands that change the information in its entry in the RAM 18 without affecting any other host's NPAP settings. In this way the ENA 10 keeps track of each individual host's NPAP information, enabling the ENA to present an individual virtual NPAP printer to each host on the network.

Once a default entry is made in the table 152, or after it is determined that this is not the first NPAP communication with the particular host 151, the processor next determines if the new NPAP packet will have an effect on the table at a decision block 153. If the contents of the NPAP packet will have an effect on the table, the table is modified at a function block 154 according to the packet. The processor then determines if further processing of the packet by the printer is required at a decision block 155. If so, or if at decision block 153 the processor determined that the packet would not affect the table, the packet is then sent to the printer at a function block 156. The processor then waits for a response to be received from the printer at a function block 157.

If the NPAP packet is one which called for a table modification but did not require further processing by the printer, the processor creates a response NPAP packet at a function block 158 to send back to the host computer. The response from the printer or the response created by the microprocessor is then sent as an NPAP packet back to the host computer using a packet size up to the maximum (such as 64 bytes).

The NPAP Request Handler 52 stores a pointer to the identification of the current host when it receives an NPAP command (along arrow 51) that expects an NPAP response (along arrow 63). These messages are received and transmitted via the Alternate Channel of ENA 10. As related above, print job communications that are received and transmitted by ENA 10 are via the Normal Channel, and the Protocol 32 stores the pointer to the identification of the current host. These pointers are necessary so that any response sent by ENA 10 to a host over the network 12 will be indeed sent to the correct host.

Figure 6:
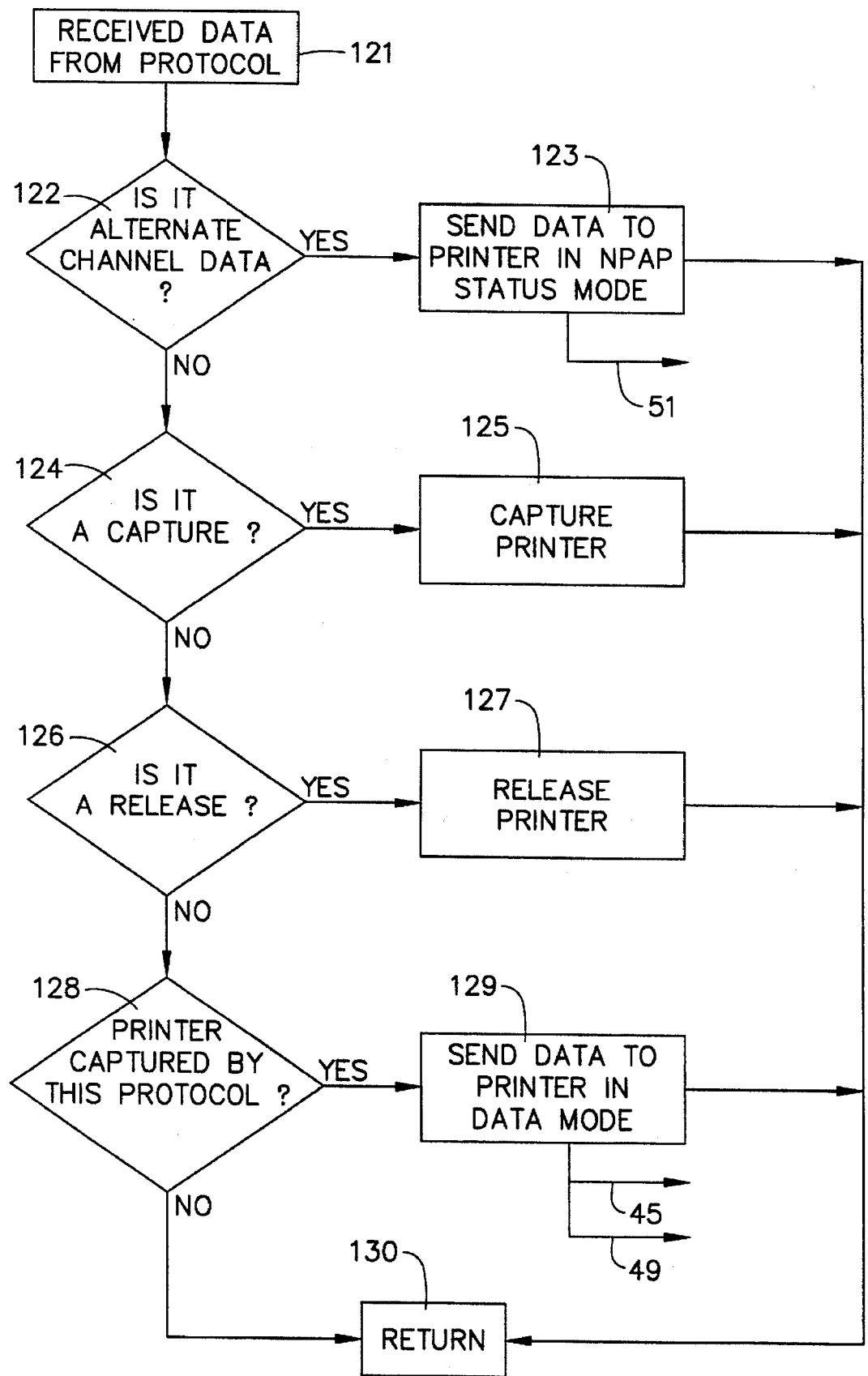
FIG. 6 is a flow chart of the operation of the task that sends data from one of the Protocol modules of the External Network Adapter of FIG. 1 to a printer.

With reference to FIG. 6, the operation of the Printer Device 34 of ENA 10 in receiving data from a Protocol 32 is described. The Printer Device 34 receives data at a function block 121 from one of the Protocols 32 and determines if it is Alternate Channel data at a decision block 122. If it is Alternate Channel data to be communicated immediately to the printer, Printer Device 34 sends the data at a function block 123 to the printer in NPAP status mode and returns at a function block 130. If the data is not Alternate Channel data, the Printer Device 34 determines if it is a "capture" of the printer at a function block 124.

If this data is a capture of the printer, Printer Device 34 captures the printer 38 at a function block 125 and returns at function block 130. If the data is not a capture of the printer, it is determined if this is a "release" of the printer at a decision block 126; and if it is a release of the printer, the printer is released at a function block 127 and the Printer Device 34 returns at function block 130. This would indicate the completion of a print job.

If the data is not a release of the printer, the Printer Device 34 determines if the printer 38 is currently captured by the sending Protocol 32 at a function block 128. If so, the data is sent to the printer 38 in data mode at a function block 129 and the Printer Device 34 returns at function block 130. If the printer 38 is not currently captured by the Protocol 32 sending the data, Printer Device 34 merely returns at function block 130.

Figure 7:
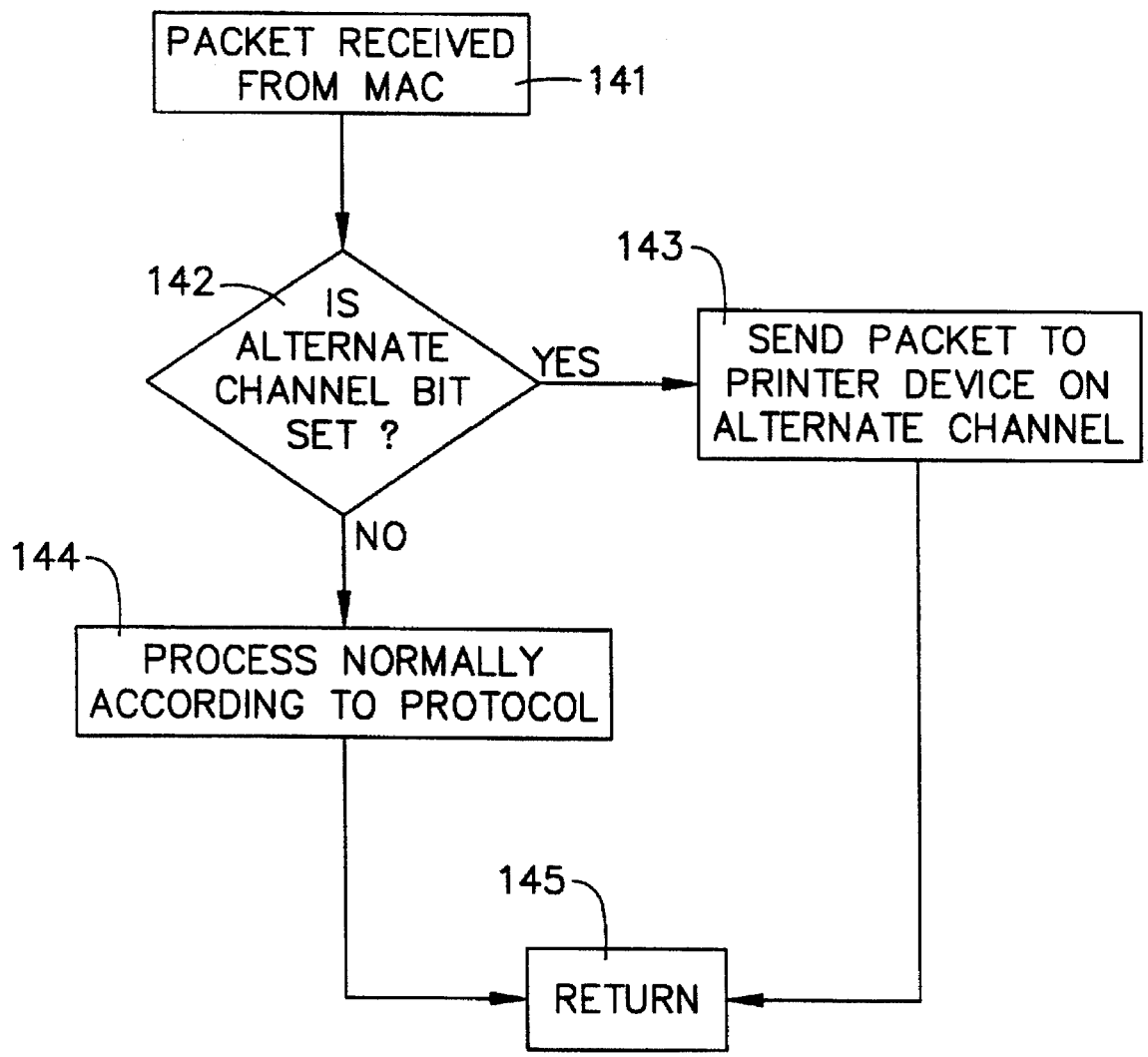
FIG. 7 is a flow chart of one of the functions of a Protocol depicted in FIG. 2 for sending data from the Media Access Control (MAC) task to the Printer Device task depicted in FIG. 2.

With reference now to FIG. 7, the handling of data by an exemplary Protocol module 32 is described as that data is received from the MAC 30. After a packet is received from the MAC 30 at a function block 141, the LexLink Protocol 32 determines if the alternate channel bit is set in that packet by a decision block 142. If so, the packet is sent to Printer Device 34 on the Alternate Channel at a function block 143, and the Protocol 32 returns at a function block 145. If the Alternate Channel bit is not set, the LexLink Protocol 32 processes the data normally to send print job data to the Printer Device 34 at a function block 144, and the LexLink Protocol 32 then returns at function block 145.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. An external network adapter for use in printing systems, said external network adapter comprising:
(a) a memory circuit for temporary storage of data, a network port, a printer port, and a processing circuit that controls the routing of data between said memory circuit, network port, and printer port, said network port being connected to at least one host computer via a communications network, said printer port being connected to a printer;
(b) said network port being configured to receive normal print data from a host computer, said normal print data being inspected by a packet writer to find any boundaries at the end of print data packets that may be contained within the normal print data;
(c) said network port being further configured to receive NPAP commands from a host computer during periods when normal print data packets are also being received;
(d) said packet writer being configured to send packets containing normal print data to said printer port, and to send NPAP commands to said printer port interspersed between normal print data packets; and
(e) said printer port being configured to transmit packets containing normal print data and packets containing a NAPA commands to said printer in the order said printer in the order said packets are received from said packet writer.

2. The external network adapter as recited in claim 1, further comprising an NPAP request handler that is configured to receive NPAP commands and NPAP queries from a host computer via said network port, said NPAP request handler being configured to send said NPAP commands and queries to said packer writer, said NPAP request handler also being configured to receive NPAP responses from said printer via a back channel data analyzer.

3. The external network adapter as recited in claim 2, wherein, under normal operating conditions, said NPAP responses match said NPAP commands and NPAP queries.

4. The external network adapter as recited in claim 2, wherein said back channel data analyzer is configured to determine the type of message received from said printer, said type of message being one of an alert message, an NPAP response, and an ASCII message from the printer's interpreter.

5. The external network adapter as recited in claim 4, wherein said back channel data analyzer is configured to transmit said alert message and said ASCII message to a host computer via said network port, and to transmit said NPAP response to a host computer via said NPAP request handler and said network port.

6. The external network adapter as recited in claim 5, wherein said alert message is transmitted to a first host computer and said ASCII message is transmitted to a second host computer.

7. The external network adapter as recited in claim 5, wherein said NPAP response is transmitted to a first host computer and said ASCII message is transmitted to a second host computer.

8. The external network adapter as recited in claim 5, wherein said alert message, said ASCII message, and said NPAP response are all transmitted to the same host computer.

9. The external network adapter as recited in claim 1, further comprising an NPAP packetizer which is configured to receive non-NPAP normal print data from said network port, to create an NPAP header, and to concatenate said NPAP header and non-NPAP normal print data into NPAP packets, and is further configured to transmit said NPAP packets to said NPAP packet writer.

10. The external network adapter as recited in claim 1, wherein said normal print data is received from a first host computer, and said NPAP commands are received from a second host computer.

11. The external network adapter as recited in claim 1, wherein said normal print data and said NPAP commands are both received from the same host computer.

12. A method for transmitting normal channel data and alternate channel data from a host computer via a network to a printer, said method comprising the steps of:
(a) providing an external network adapter including a memory circuit for temporary storage of data, a network port, a printer port, and a processing circuit that controls the routing of data between said memory circuit, network port, and printer port, said network port being connected to at least one host computer via a communications network, said printer port being connected to a printer;
(b) receiving normal channel print data from a host computer via said network port, inspecting said normal channel print data to find any end boundaries of print data packets that may be contained therewithin, and transmitting said print data packets to a printer via said printer port; and
(c) receiving alternate channel NPAP commands from a host computer via said network port during periods when normal channel print data is also being received, and transmitting said NPAP commands interspersed between said normal channel print data packets to a printer via said printer port.

13. The method as recited in claim 12, wherein said normal channel print data includes both non-NPAP print jobs and host-packetized NPAP print jobs.

14. The method as recited in claim 12, further comprising the steps of:
(a) receiving normal channel ASCII messages from the interpreter of a printer via said printer port, and transmitting said ASCII messages to a host computer via said network port; and
(b) receiving alternate channel alert messages and alternate channel NPAP responses from a printer via said printer port, and transmitting said alert messages and NPAP responses to a host computer via said network port.

15. The method as recited in claim 14, wherein said NPAP responses match said NPAP commands under normal operating conditions.

* * * * *